United States Patent [19]
Youngblood

[11] Patent Number: 5,636,274
[45] Date of Patent: Jun. 3, 1997

[54] SWITCH CONTROLLER AND METHOD

[75] Inventor: Douglas L. Youngblood, Palm Bay, Fla.

[73] Assignee: Harris Corp., Melbourne, Fla.

[21] Appl. No.: 372,118

[22] Filed: Jan. 13, 1995

[51] Int. Cl.[6] .................................................. H04M 19/00
[52] U.S. Cl. ........................ 379/413; 379/377; 379/385; 379/252; 361/119
[58] Field of Search ........................ 379/399, 413, 379/418, 324, 400, 412, 252, 253, 385, 377; 363/21, 127; 361/117, 118, 119

[56] References Cited

U.S. PATENT DOCUMENTS

| | | | |
|---|---|---|---|
| 5,103,387 | 4/1992 | Rosenbaum et al. | 363/21 |
| 5,323,461 | 6/1994 | Rosenbaum et al. | 379/413 |
| 5,428,682 | 6/1995 | Apfel | 379/413 |

*Primary Examiner*—Thomas W. Brown
*Assistant Examiner*—Jacques M. Saint-Surin
*Attorney, Agent, or Firm*—Rogers & Killeen

[57] ABSTRACT

A circuit and method for reducing power consumption during operation of a solid state switch that controls connection of a source of alternating current to a load includes a circuit for determining a voltage across the switch. The switch is operated upon receipt of both a command signal and an indication that the voltage across the switch is less than a predetermined value. When used in a telephone system subscriber line interface circuit (SLIC), the circuit controls two switches that connect an ac ring signal from an ring generator to a telephone. The voltage sensed across the switch may be converted to a low current level and the circuit embodied in an integrated circuit.

22 Claims, 4 Drawing Sheets

SWITCH CONTROLLER AND METHOD

BACKGROUND OF THE INVENTION

The present invention relates to circuits and methods for controlling the operation of solid state switches, and more particularly to a circuit for reducing the power consumed during operation of a solid state switch by limiting switch operation to periods when the voltage across the switch is less than a predetermined value.

Switches may consume and waste power if the switch is operated when the voltage across the switch is high. Solid state switches require a finite period of time to transition from being highly resistive (off) to being conductive (on), and vice versa. During this period of time, both the voltage across the switch and the current through the switch are changing. As will be appreciated, during the period of time when both voltage and current are present, power is being consumed by the switch. While the power consumed by solid state switches may be reduced by decreasing the time required for the transition, the time cannot be reduced to zero.

In the event a signal across the switch is time varying, power consumption may be reduced by selecting a time for operating the switch when the voltage across the switch is low. For example, the voltage across the switch may be zero during transitions from plus to minus in a sinusoidal (e.g., alternating current) signal.

Telephone systems may include solid state switches for providing an alternating current ring signal to a telephone, and the power consumed by such switches is desirably reduced.

With reference now to FIG. 1, a telephone system 10 (including private-area branch exchanges—PABX) may include a central office (CO) connected to subscriber telephones 12 through a subscriber line interface circuit (SLIC) 14. SLICs perform various functions, one of which is to provide a ring signal to a telephone to indicate that the telephone is being called. A ring signal generator 16 provides a constantly running ac signal (typically 93 volts rms) for ringing the telephone. When a telephone is to be rung, the SLIC 14 operates switches 18 to connect the ring signal to the telephone 12 and disconnect the telephone 12 from the voice signals that will be provided by the SLIC 14.when the call is answered. In newer telephone systems, the switches 18 are typically solid state switches. The SLIC 14 also provides power from a battery 20 (typically 48 volts dc) to operate the system. The battery 20 also provides a dc bias for the ring signal. Further discussion of SLICs for telephone systems may be found in the article "SLIC Ejects Relays From PABX Line Cards" by Frank Goodenough, appearing in the Jul. 11, 1994 issue of *Electronic Design*, that is incorporated by reference.

With reference now to FIG. 2, the switches 18 may be operated by a signal from a bank of switch drivers (referred to herein as a single driver 22). The driver 22 receives instructions from a gate 24 that provides a command to the driver 22 when a ring command 26 has been received indicating that the telephone is to be rung, provided the ac ring signal from the ring generator 16 is within a predetermined number of volts of a zero crossing. To this end, it is known to connect a comparator 28 to both sides of the ring generator 16 to provide a signal (e.g., a voltage) to the gate 24 that is operated when the ring signal is within a predetermined number of volts of a zero crossing, and the ring command 26 has been received.

This arrangement works reasonably well for systems that have a ring generator 16 and source of dc bias 20 connected such as illustrated in FIGS. 1 and 2. However, not all telephone systems are arranged in this manner. For example, in some systems the source of dc bias 20 is connected between the ring generator 16 and ground, and in other systems a second ring generator is added. Each of these arrangements requires different connections for determining the zero crossing of the ring signal, and it is desirable to provide a circuit for controlling the operation of the switches 18 that is operable regardless of the manner in which the ring generator and source of dc bias are connected.

Another problem with the switch controlling circuits of the prior art is that they use discrete components, primarily due to the high voltages that are being carried. Discrete components add cost and require more space than components that are in integrated circuits. It is desirable to provide an integrated circuit for controlling the switches in order to decrease circuit size and cost and to increase reliability. Integrated circuits. also provide the added benefit of reducing unwanted transient currents and noise.

Accordingly, it is an object of the present invention to provide a novel circuit and method for controlling a switch that obviates the problems of the prior art.

It is another object of the present invention to provide a novel circuit and method for controlling a solid state switch in which the voltage across the switch is sensed to determine when the switch may be operated.

It is yet another object of the present invention to provide a novel circuit and method for controlling switches that connect a ring signal to a telephone in which the voltage across the switches and the telephone is evaluated to determine when the switches may be operated.

It is still another object of the present invention to provide a novel circuit and method for controlling switches that connect a ring signal to a telephone in which the voltages at the switch terminals are reduced before comparison so that the circuit may be embodied in an integrated circuit.

It is a further object of the present invention to provide a novel circuit and method for controlling solid state switches that connect a ring signal to a telephone in which the circuit for controlling the switches and the switches are in an integrated circuit.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
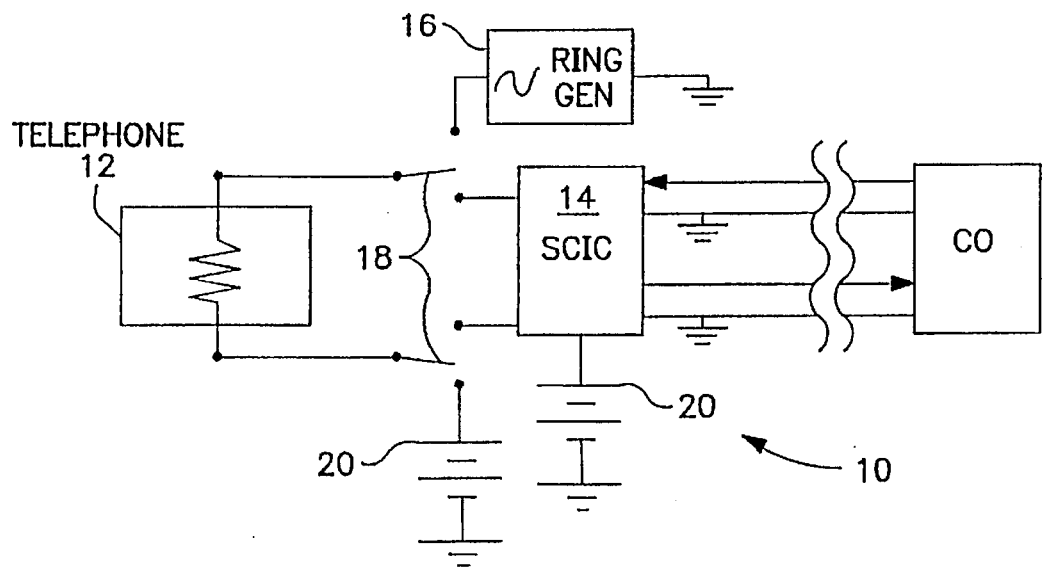
FIG. 1 is a schematic diagram of a prior art telephone system.
Figure 2:
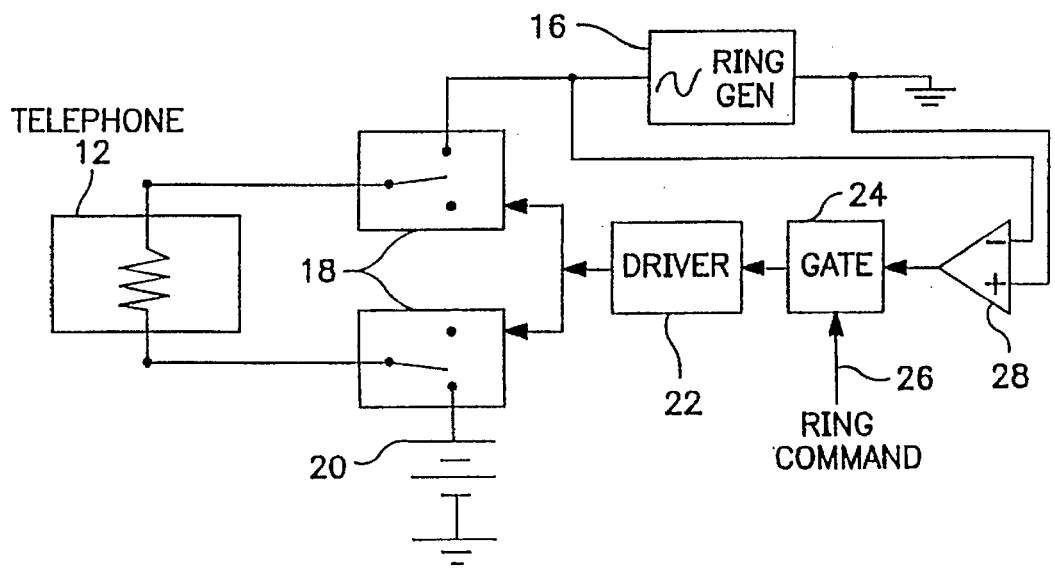
FIG. 2 is a schematic diagram of a portion of a prior art telephone system illustrating a circuit for controlling operation of the switches that connect a ring generator to a telephone.
Figure 3:
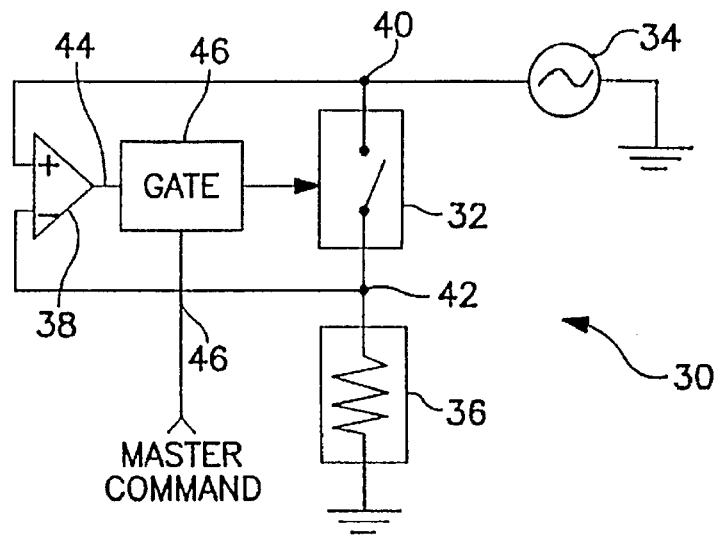
FIG. 3 is a schematic diagram of an embodiment of the present invention having a single solid state switch connecting a load to a source of power.

With reference now to FIG. 3, an embodiment 30 of the circuit of the present invention for reducing power consumption during operation of a single solid state switch 32 that controls connection of a source 34 of alternating current to a load 36, may include a comparator 38 having two inputs connected to terminals 40 and 42 of the switch 32 so that the comparator's output 44 is related to a voltage across the switch 32. The output 44 may be provided to a current gate 46 for providing a command signal to operate the switch 32 upon receipt of (1) a master command 48 indicating that the source 34 is to be connected to the load 36, and (2) a voltage in output 44 that indicates that the voltage across the switch 32 is less than a predetermined value. In operation, the gate 46 delays the master command 48 to connect the load 36 to the source 34 until the voltage across the switch 32 is below the predetermined value. This action minimizes the transient turn-on current and reduces the power consumption of the switch 32. The comparator 38, gate 46 and switch 32 are desirably integrated into an integrated circuit.

Figure 4:
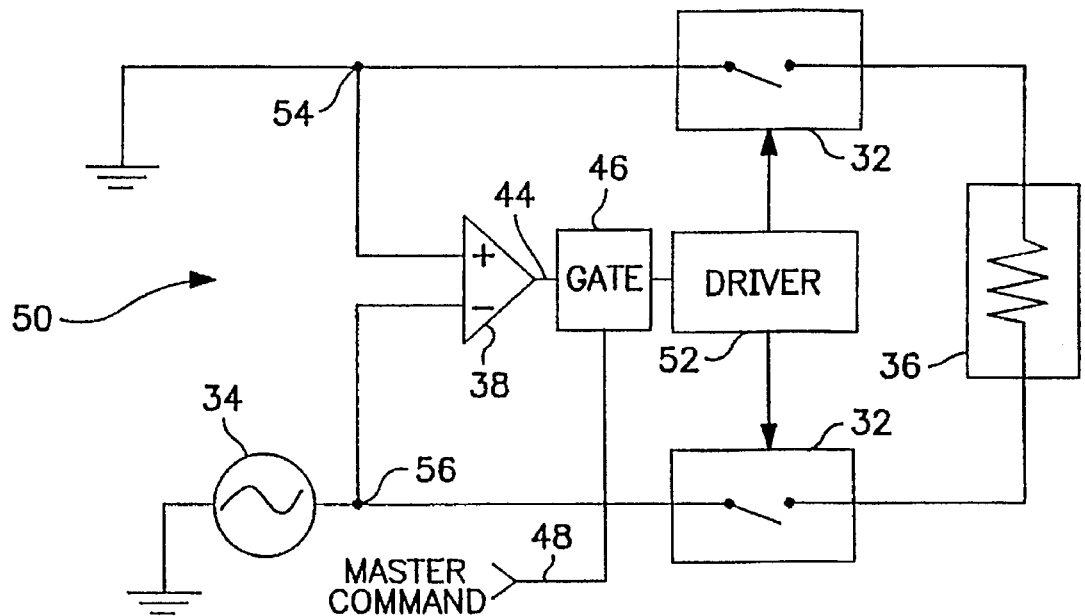
FIG. 4 is a schematic diagram of a further embodiment of the present invention having a pair of solid state switches with a load therebetween.

A further embodiment 50 of the present invention for operation with two solid state switches 32 with a load 36 therebetween is illustrated in FIG. 4 in which like numerical designations have to been used to indicate features like those of FIG. 3 to facilitate an understanding thereof. A source 34 of power may be connected to a load 36 through two switches 32 that are operated by a driver 52. A comparator 38 may be connected to the switches 32 at terminals 54 and 56 so that the comparator 38 output 44 is proportional to a voltage across the two switches 32 and the load 36. The output 44 may be provided to a gate 46 that receives a master command 48, and provides a signal to the driver 52 to operate the switches 32 when the voltage in output 44 is below a predetermined threshold, and the master command 48 has been received. As will be appreciated, the source 34 may be connected to either or both terminals 54 and 56.

Figure 5:
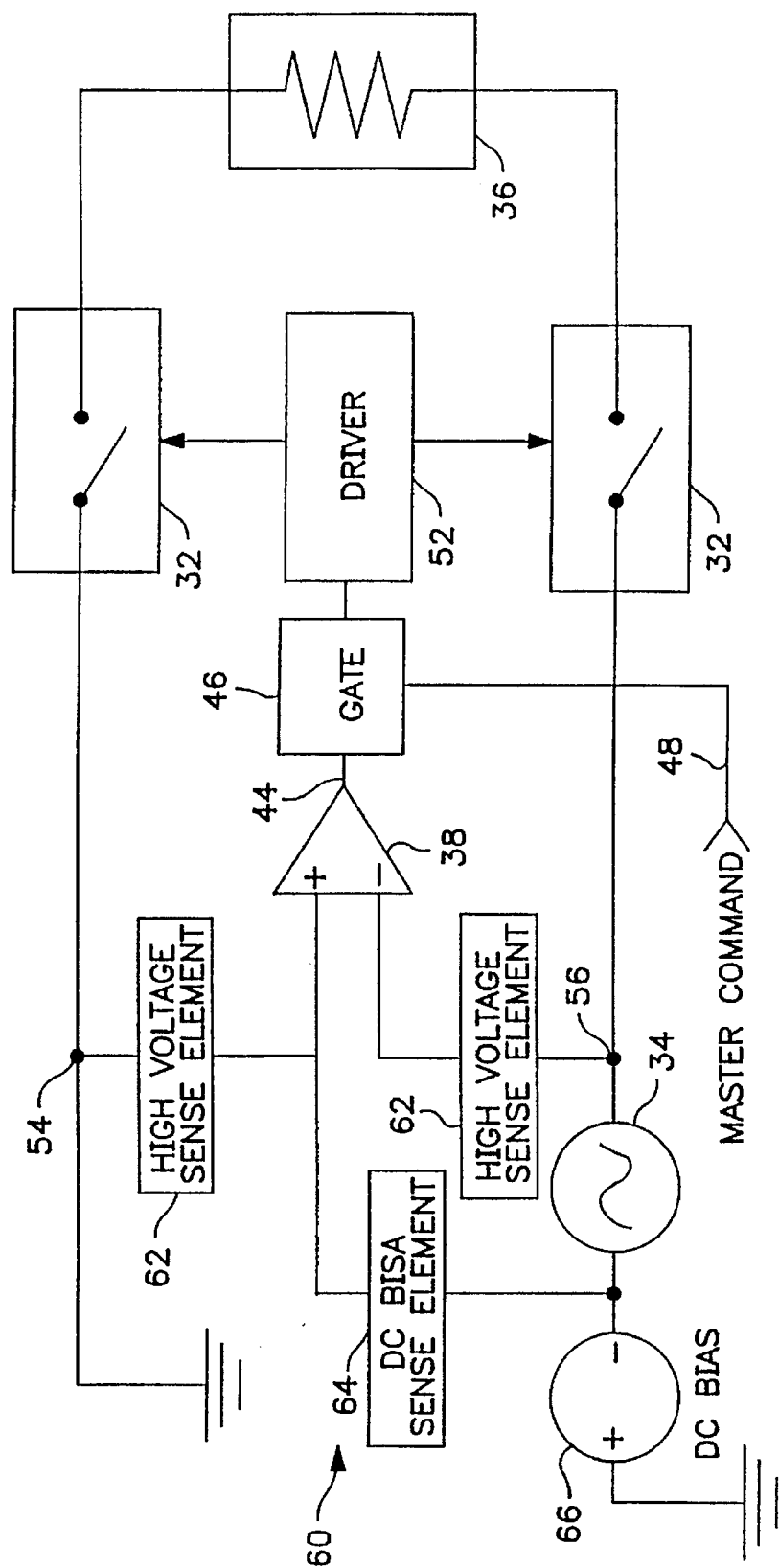
FIG. 5 is a schematic diagram of a further embodiment of the present invention that may find application in a telephone system.

In a further embodiment 60 of the present invention that may find application in a telephone system, and with reference to FIG. 5 in which the numerical designations of FIG. 4 have been repeated to facilitate an understanding thereof, the load 36 may be a telephone and the source 34 may be a ring signal generator. The voltages provided to the comparator 38 may be converted to low current levels by providing high voltage sensing elements 62 between the terminals 54 and 56 and the inputs to the comparator 38. The sensing elements 62 may reduce the voltage to the comparator inputs to a low current level that allows the components to be embodied in an integrated circuit. The sensing elements 62 may be matched high voltage, 500 K$\Omega$ resistors, for example, that convert the high voltage at terminals 54 and 56 (e.g., 93 volts rms) to low valued currents proportional to the voltage present across the switches 32 and the load 36. A third high voltage sensing element 64 may be connected between the source of dc bias 66 and either one of the inputs to the comparator 38 to generate a current proportional to the dc bias voltage used to power the telephone system. Note that the load 36 is charged to the value of the dc bias when the source 34 is not connected (the load is capacitive at this time). When the source 34 equals the dc bias voltage (at a source zero crossing), the voltage across the switches is zero. Desirably the comparator 38, gate 46, and driver 52 are in a single integrated circuit. The two switches 32 may also be included in the integrated circuit.

Figure 6:
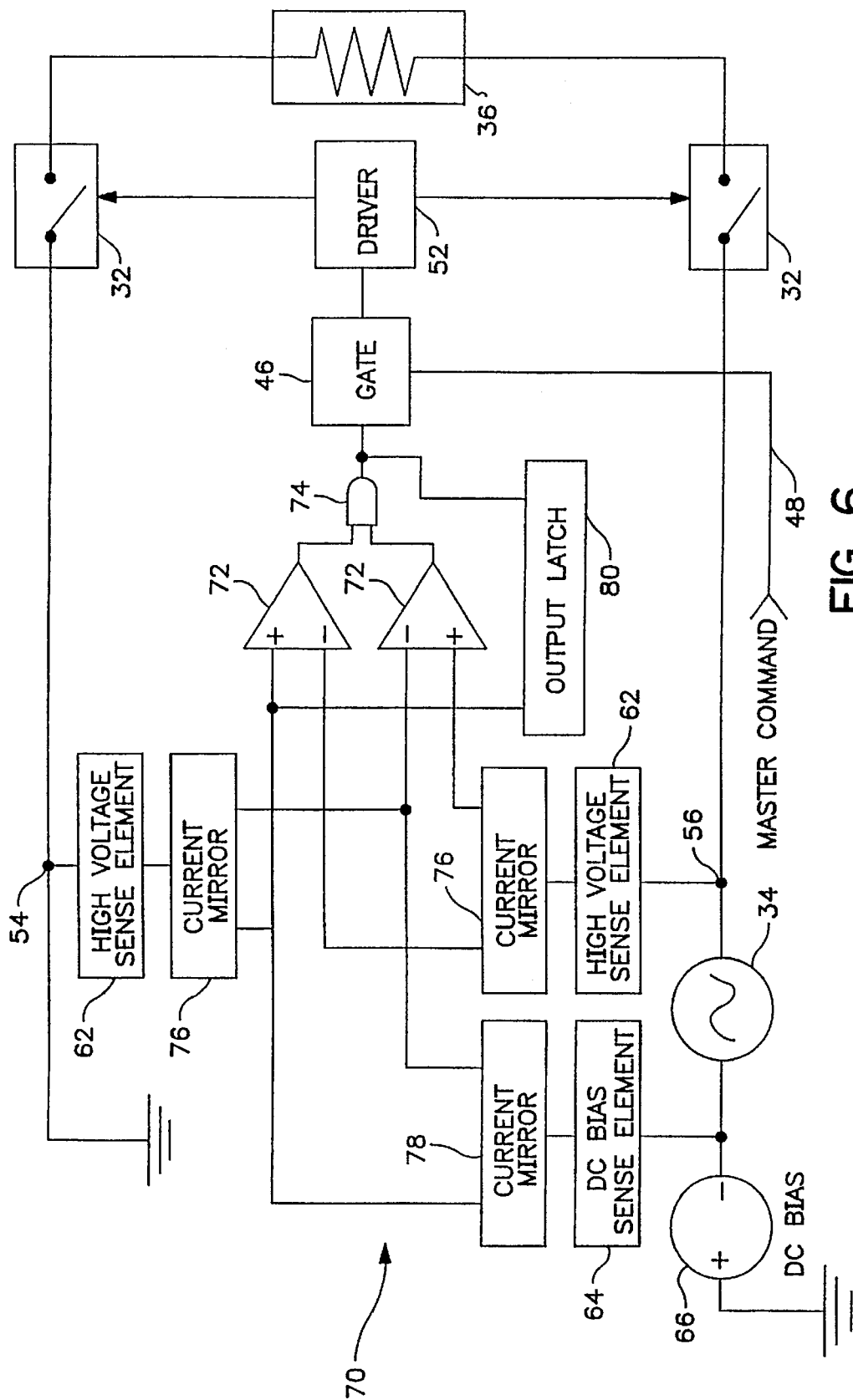
FIG. 6 is a schematic diagram of a further embodiment of the present invention that may find application in a telephone circuit in which positive and negative transitions may be sensed.

In a further embodiment 70, the present invention may sense both positive and negative transitions by adding current mirrors and another comparator, such as illustrated in FIG. 6. Two comparators 72 may provide outputs to an AND gate 74 that provides a signal to gate 46 for passing the master command signal 48. Current mirrors 76 duplicate the current from the sensing elements 62 and provide the duplicates to the two comparators 72. Hysteresis may be built into the system by adjusting the ratio of dc bias current provided to the comparators 72 from current mirror 78. This may be desirable since the comparators 72 are comparing the same currents, but in opposite polarities, and it is desirable not to have the comparators 72 change states at exactly the same current. Small errors might not permit the outputs of AND gate 74 to ever be true. Once a true state is achieved by the AND gate 74, a current is fed back to the inputs of the comparators 72 by output latch 80 to maintain drive current to the switches 32 while the master command 48 is present, regardless of the voltages presented to the sensing elements 62. The currents that provide the hysteresis make each comparator 32 have a true output.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A circuit for reducing power consumption during operation of a solid state switch, the switch controlling connection of a source of alternating current to a load connected to a terminal of the switch, the circuit comprising:

a gate for providing a command signal to operate the switch upon receipt of (1) the command signal and (2) an indication that the voltage across the switch is less than a predetermined value; and a comparator for providing to said gate from said comparator's output the indication that the voltage across the switch is less than the predetermined value, said comparator having two inputs that are compared, each of said inputs being connected to a separate terminal of the switch so that said comparator's output is related to a voltage across the switch.

2. The circuit of claim 1 wherein said gate, said comparator, and the solid state switch are in a single integrated circuit.

3. The circuit of claim 1 wherein each of said inputs to said comparator is connected to a terminal of the switch through a high voltage sensing element for converting a voltage at said terminal to a low current level.

4. A circuit for controlling the operation of two switches that connect a source of power to a load between the two switches, the circuit comprising:

a driver for operating the two switches responsive to receipt of a command signal;

a gate for providing the command signal to said driver upon receipt of both the command signal and an indication that the voltage across the two switches and the load is less than a predetermined value; and a comparator for providing to said gate from said comparator's output the indication that the voltage across the switches and the load is less than the predetermined value, said comparator having two inputs, each of said inputs being connected to one of the two switches so that said comparator's output is proportional to a voltage across the two switches and the load.

5. The circuit of claim 4 wherein each of said two inputs to said comparator is connected to its respective switch through a high voltage sensing element for converting a voltage across said sensing element to a low current level.

6. The circuit of claim 5 wherein each said high voltage sensing element comprises a resistor matched to the other said high voltage sensing element.

7. The circuit of claim 4 wherein one of said two inputs is also connected to a bias voltage that is also applied to the load.

8. The circuit of claim 7 wherein each of said two inputs to said comparator is connected to its respective switch through a high voltage sensing element for converting a voltage provided to said comparator to a current, and a further comprising a further high voltage sensor for connecting the bias voltage to said one of said two inputs.

9. The circuit of claim 4 wherein said driver, said gate, and said comparator are in a single integrated circuit.

10. The circuit of claim 9 wherein each of the two switches is a solid state switch that is integrated into said integrated circuit.

11. A control circuit for a telephone subscriber line interface circuit (SLIC) for controlling the operation of two solid state switches that provide an alternating current ring signal to a telephone connected between the two switches, the telephone also being connected to a SLIC bias voltage, the control circuit comprising:

a driver for operating the two solid state switches responsive to receipt of a command signal;

a gate for providing the command signal to said driver upon receipt of a ring signal and an indication that the voltage across the two switches and the telephone is less than a predetermined value;

a comparator for providing to said gate from said comparator's output the indication that the voltage across the two switches and the telephone is less than the predetermined value; and said comparator having two inputs, a first input connected to one of the two switches through a first voltage sensing element for converting a voltage thereacross to a current, and a second input connected to (a) the other of the two switches through a second voltage sensing element for converting a voltage thereacross to a current and (b) the SLIC bias voltage through a third voltage sensing element for converting the voltage thereacross to a current, wherein said comparator's output is proportional to a voltage across the two switches and the telephone.

12. The control circuit of claim 11 wherein said driver, said gate, and said comparator are in a single integrated circuit.

13. The control circuit of claim 12 wherein the two switches are integrated into said integrated circuit.

14. A method of reducing power consumption during operation of a solid state switch, the switch controlling connection of a source of alternating current to a load connected to a terminal of the switch, the method comprising the steps of:

(a) providing from a gate a command signal to operate the switch upon receipt of an indication that the voltage across the switch is less than a predetermined value; and (b) comparing the voltage at one terminal of the switch to the voltage at the other terminal of the switch by connecting the two switch terminals to separate inputs of a comparator that has an output connected to the gate, the comparator's output being related to the voltage across the switch; and (c) providing the indication to the gate when the comparator's output is less than a predetermined value, whereby the power consumed by the switch during operation of the switch is reduced by limiting operation of the switch to a period when the voltage across the switch is less than the predetermined value.

15. The method of claim 14 further comprising the step of connecting each of the inputs to the comparator to a terminal of the switch through a high voltage sensing element that converts a voltage thereacross to a low current level.

16. A method of controlling the operation of two solid state switches in a telephone subscriber line interface circuit (SLIC) that provide an alternating current ring signal to a telephone connected between the two switches, the telephone also being connected to a SLIC bias voltage, the method comprising the steps of:

(a) connecting a comparator to the two switches so that the comparator's output is proportional to a voltage across the two switches and the telephone, a first comparator input being connected to one of the two switches, and a second comparator input connected to the other of the two switches and to the SLIC bias voltage;

(b) evaluating at the comparator the voltage across the two switches and the telephone to determine whether the voltage across the two switches and the telephone is less than a predetermined value;

(c) providing a command signal for operating the two switches when the ring signal is to be provided to the telephone; and (d) operating the two switches when the command signal is provided if the voltage across the two switches and the telephone is less than the predetermined value.

17. A circuit for reducing power consumption during operation of a high voltage solid state switch, the switch controlling connection of a source of alternating current to a load through the terminals of the high voltage switch, the circuit comprising:

a gate for providing a command signal to operate the switch upon receipt of (1) the command signal and (2) an indication that the voltage across the switch is less than a predetermined value; and a current comparator for providing to said gate from said comparator's output the indication that the voltage across the switch is less than the predetermined value, said comparator having two inputs that are compared, each of said inputs being connected to a separate terminal of the switch through a voltage to current converter so that the comparator's inputs are currents and so that said comparator's output is related to a voltage across the switch.

18. The circuit of claim 17 wherein said switch, said gate and said comparator are part of the same integrated circuit.

19. In a high voltage, solid state switch which controls the connection of a source of alternating current to a load, the method of reducing the power consumption of the switch during operation of the switch comprising the steps of:

(a) providing a command signal;

(b) sensing the voltage across the switch;

(c) comparing the sensed voltage across the switch with a predetermined reference voltage to provide a control signal only when the switch voltage is less than the reference voltage; and (d) operating the switch responsively to the command signal and to the control signal, whereby the power consumed by the switch during operation of the switch is reduced by limiting the operation of the switch to time intervals when the voltage across the switch is less than the predetermined value.

20. The method of claim 19 wherein the voltage across the switch is determined by the steps of:

sensing the voltage at the terminals at opposite ends of the switch;

converting the sensed voltage to a low level current; and comparing the low level currents to provide a signal representative of the voltage across the switch.

21. In a telephone subscriber line interface circuit (SLIC) that provides an alternating current ring signal and a SLIC bias voltage to a telephone connected between two high voltage, solid state switches, a method of controlling the operation of the two switches to reduce the power consumed in the operation thereof comprising the steps of:

(a) providing a signal representative of a voltage across the two switches and the telephone, (b) comparing the signal with a predetermined reference value;

(c) providing a command signal when the ring signal is to be provided to the telephone; and (d) operating the two switches when the command signal is provided only if the signal is less than the predetermined value, to thereby reduce the power consumed in the operation of the two switches.

22. The method of claim 21 wherein the signal is a current.

* * * * *